(12) United States Patent
Nakajima et al.

(10) Patent No.: US 7,185,746 B2
(45) Date of Patent: Mar. 6, 2007

(54) DAMPER-MOUNTING STRUCTURE

(75) Inventors: Kiyoshi Nakajima, Wako (JP); Hidetoshi Amano, Wako (JP); Hiro Nushii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/801,966

(22) Filed: Mar. 16, 2004

(65) Prior Publication Data
US 2004/0239066 A1 Dec. 2, 2004

(30) Foreign Application Priority Data
Mar. 18, 2003 (JP) ............... 2003-073436
Mar. 18, 2003 (JP) ............... 2003-073437

(51) Int. Cl.
F16F 9/00 (2006.01)
(52) U.S. Cl. ............ 188/321.11; 267/220; 280/124.155
(58) Field of Classification Search ......... 280/124.155; 267/220, 222; 188/321.11
See application file for complete search history.

(56) References Cited

U.S. PATENT DOCUMENTS

| | | | | |
|---|---|---|---|---|
| 2,334,597 A | * | 11/1943 | Badertscher | 267/220 |
| 4,042,259 A | * | 8/1977 | Fiedler et al. | 280/124.155 |
| 4,175,771 A | * | 11/1979 | Muzechuk et al. | 280/124.155 |
| 4,200,307 A | * | 4/1980 | Szabo | 280/124.155 |
| 4,810,003 A | * | 3/1989 | Pinch et al. | 188/321.11 |
| 5,009,401 A | * | 4/1991 | Weitzenhof | 267/64.21 |
| 5,484,161 A | * | 1/1996 | McIntyre | 280/124.155 |
| 6,161,822 A | * | 12/2000 | Hurst et al. | 188/321.11 |
| 6,260,835 B1 | * | 7/2001 | Angles et al. | 188/321.11 |
| 6,293,572 B1 | * | 9/2001 | Robbins et al. | 280/124.155 |
| 6,592,112 B2 | * | 7/2003 | Bishop et al. | 267/220 |

FOREIGN PATENT DOCUMENTS

| | | |
|---|---|---|
| JP | 03-028541 | 2/1991 |
| JP | 3-64175 | 6/1991 |
| JP | 6-35707 | 9/1994 |
| JP | 6-87155 | 12/1994 |
| JP | 10-273073 | 10/1998 |
| JP | 2000-186738 | 7/2000 |

* cited by examiner

*Primary Examiner*—Robert A. Siconolfi
(74) *Attorney, Agent, or Firm*—Rankin, Hill, Porter & Clark LLP

(57) ABSTRACT

An upper portion of a damper connected at its lower end to a lower arm of a suspension is accommodated within a side frame having a closed section. An upper spring seat, which is a mounting portion for the damper, is fixed to a lower surface of the side frame by a bolt. Thus, the support rigidity of the damper is enhanced, whereby the responsiveness of the damper to a load input from the lower arm is improved. Moreover, since the upper portion of the damper is accommodated within the side frame, an internal space in the side frame can be utilized for disposition of the damper. In addition, it is unnecessary to arrange the side frame and the damper side-by-side in a lateral direction of the vehicle body, and hence it is easy to ensure a space for disposition of the suspension.

7 Claims, 4 Drawing Sheets

DAMPER-MOUNTING STRUCTURE

BACKGROUND OF THE INVENTION

1. Field of the Invention

The present invention relates to a damper-mounting structure in which a damper for buffering the vertical movement of a suspension arm or a knuckle of a suspension is mounted to a vehicle body.

2. Description of the Related Art

A damper-mounting structure in which an upper portion of a damper of an automobile is supported on a vehicle body is known from Japanese Patent Application Laid-open No. 2000-186738 and Japanese Patent Application Laid-open No. 10-273073.

In the damper-mounting structure described in Japanese Patent Application Laid-open No. 2000-186738, an upper spring bearing for receiving an upper end of a coil spring of the damper is mounted on an inner surface of a tire house or wheel well, and an upper end of a piston rod of the damper is passed through the upper spring bearing from below to above and fixed by a nut from above the wheel well.

In the damper-mounting structure described in Japanese Patent Application Laid-open No. 10-273073, a bracket mounted on an inner surface of a wheel well and an upper end of a piston rod of the damper are fixed to one another by a bolt passed through the upper end of the piston rod in a direction perpendicular to an axis of the piston rod.

When the upper end of the damper is mounted to the inner surface of a wheel well formed of a thin plate material, the following problem is encountered: the wheel well is flexed by a load input from the damper, resulting in a reduction in responsiveness of the damper. To solve this problem, it is conventional to superimpose a reinforcing member on the wheel well, but there is a problem that the reinforcing member increases the weight of the vehicle. In addition, the damper and a vehicle body frame are arranged side by side in a lateral direction of the vehicle body, and thus it is difficult to ensure sufficient space for disposition of the damper, while avoiding interference with the vehicle body frame.

In addition, the damper-mounting structure described in Japanese Patent Application Laid-open No. 2000-186738 has the following problem: a worker retains the damper within the wheel well, and another worker affixes the upper end of the piston rod to the wheel well from above. Therefore, this structure requires two workers, resulting in a poor working efficiency.

Further, the damper-mounting structure described in Japanese Patent Application Laid-open No. 10-273073 has the following problem: in a state in which a worker has retained the damper within the wheel well and has positioned a bolt bore in a bracket and a bolt bore in the upper end of the piston rod of the damper, it is necessary to align the bolt bores and to insert the bolt through the bolt bores. Therefore, it is difficult for the worker to retain the damper in one hand and to insert the bolt through the bolt bores with the other hand. Accordingly, the worker is required to have a high level of skill and manual dexterity to perform this operation.

SUMMARY OF THE INVENTION

The present invention is directed toward providing a damper-mounting structure, wherein the support rigidity of the upper portion of the damper can be enhanced, and the space for disposition of the damper can be ensured.

The present invention is further directed toward a damper mounting process that reduces the skill or manual dexterity required to fix the upper portion of the damper to the vehicle body.

In accordance with the present invention, a damper-mounting structure is provided for a damper having a lower end connected to a suspension and an upper portion that is accommodated within a vehicle body frame having a closed section. A damper mounting portion is fixed to a lower surface of the vehicle body frame.

With the above arrangement, since the mounting portion for the damper is fixed to the lower surface of the vehicle body frame having a closed section, the support rigidity of the damper is improved, whereby the responsiveness of the damper to a load input from the suspension is enhanced. In addition, since the upper portion of the damper is accommodated within the vehicle body frame, an internal space in the vehicle body frame can be utilized for the disposition of the damper, reducing the space required to accommodate the damper. Moreover, it is unnecessary to arrange the vehicle body frame and the damper side-by-side in a lateral direction of a vehicle body, and hence it is easy to ensure a space for disposition of the suspension.

In further accordance with the present invention, the damper mounting structure includes a temporary fixing means at the upper portion of the damper. The damper is temporarily fixed, via the temporary fixing means, to the vehicle body from below the vehicle body With the above arrangement, the damper is temporarily fixed to the vehicle body via the temporary fixing means provided at the upper portion of the damper and, in this state, the damper is fixed to the vehicle body from below. Therefore, one worker is not required to insert the damper from below the vehicle body while another worker fixes the damper from above the vehicle body, as required in the prior art. Rather, a single worker can mount the damper of the present invention to the vehicle, thereby enhancing the assembly process. Especially, the temporarily fixed damper is not dropped even if the worker releases his hand, further easing assembly and mounting of the damper to the vehicle.

In further accordance with the present invention, the temporary fixing means is a hook-shaped locking projection. The damper is temporarily fixed to the vehicle body from below the vehicle by inserting the locking projection into a locking bore formed in the vehicle body and rotating the damper to bring the locking projection into engagement with a locking surface of the vehicle body adjacent the locking bore.

With the above arrangement, the temporary fixing means is comprised of the hook-shaped locking projection, and when the locking projection is inserted into the locking bore and the damper is rotated, the locking projection is brought into engagement with the locking surface adjacent the locking bore. That is, the damper is temporarily fixed to the vehicle body with a simple operation. Moreover, engagement of the locking projection with the locking surface ensures that, even if the fixing of the damper to the vehicle body is loosened, the damper will not fall out of the vehicle body.

BRIEF DESCRIPTION OF THE DRAWINGS

These and further objects, features, and advantages of the invention will become apparent from the following description of the preferred embodiment taken in conjunction with the accompanying drawings, wherein.

DESCRIPTION OF THE PREFERRED EMBODIMENT

The present invention will now be described by way of a preferred embodiment with reference to the accompanying drawings.

Initially, it is noted that a side frame 11 corresponds to the vehicle body frame of the present invention; an upper spring seat 31 in the embodiment corresponds to the mounting portion of the present invention; and a locking projection 31a in the embodiment corresponds to the temporary fixing means of the present invention.

Figure 1:
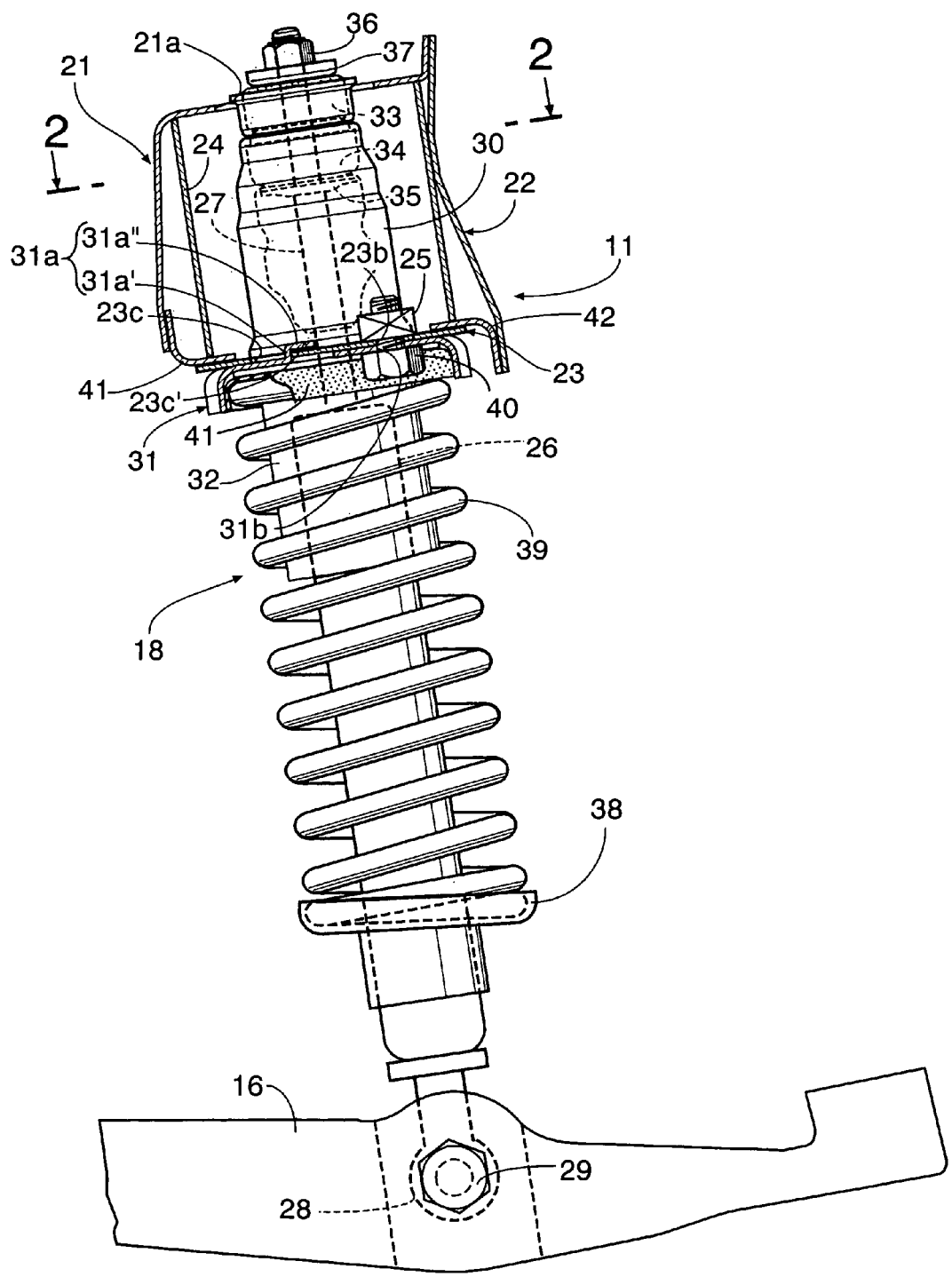
FIG. 1 is a vertical sectional view of a damper according to the present invention, illustrating the damper mounted to the vehicle body frame.
Figure 2:
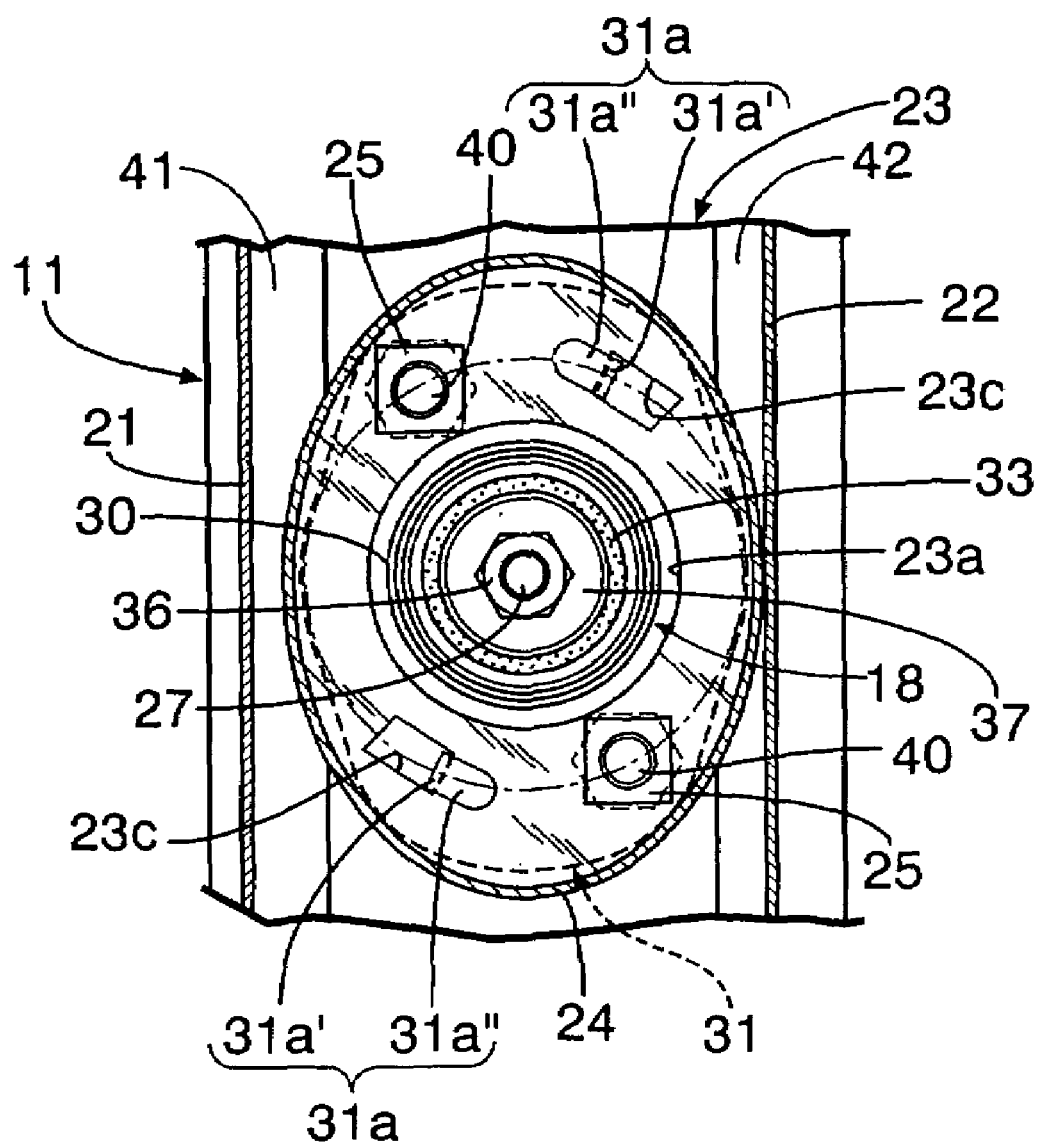
FIG. 2 is a sectional view taken along line 2—2 in FIG. 1.

As shown in FIGS. 1 and 2, a side frame 11 of an automobile is formed into a quadrilateral shape in section by welding to one another a first member 21 having an L-shape in section, second and third members 22 and 23 each having a generally flat plate-shape in section, and first and second curved members 41 and 42. A tubular bulkhead 24 is disposed between, and welded at its upper and lower ends, to a lower surface of the first member 21 and an upper surface of the third member 23, which are vertically opposed to each other. The bulkhead 24 is somewhat oblong or oval in shape when viewed from above, as shown best in FIGS. 2 and 4.

A circular opening 21a is formed in the first member 21 for communication with the interior of the bulkhead 24, and a circular opening 23a (see FIG. 2) is formed in the third member 23 for communication with the interior of the bulkhead 24. The circular openings 21a, 23a are preferably aligned or coaxial with one another.

Two bolt bores 23b, 23b and two locking bores 23c, 23c are formed in the third member 23 at locations spaced radially from the circumference of the circular opening 23a in the third member 23. The locking bores 23c are preferably equidistantly spaced from a center of the circular opening 23a, which generally corresponds with an axis of the damper, described hereinafter. Each locking bore 23c is somewhat elongated, in that it has a length dimension that is greater than its width dimension, as illustrated. A surface of the third member 23 adjacent the locking bore 23c is referred to hereinafter as a locking surface 23c' for reasons that will be apparent from the following disclosure. The bolt bores 23b are also preferably equidistantly spaced from the center of the circular opening 23a. In the preferred and illustrated embodiment the bolt bores 23b and the locking bores 23c are spaced identical radial distances from the center of the circular opening 23a (and from the outer edge of the circular opening 23a), although this is not required. Rather, it is contemplated that the bolt bores 23b and the locking bores 23c may be located at differing distances from the circular opening 23a. Two weld nuts 25, 25 are provided on an upper surface of the third member 23 in alignment with the bolt bores 23b, 23b, and are each adapted to threadably receive a bolt 40, described hereinafter.

A damper 18 includes an oil-filled cylinder 26 and a piston rod 27. The piston rod 27 is received in the cylinder 26 and projects out of an upper end of the cylinder 26. The cylinder 26 is supported at its lower end on an intermediate portion of a lower arm 16 through a rubber bush joint 28 and a bolt 29.

A cap-shaped piston rod holder 30, a dish-shaped upper spring seat 31 and a cylindrical cylinder cover 32 are provided integrally with one another, and the piston rod 27 is resiliently supported on an upper surface of the piston rod holder 30. More specifically, the piston rod 27 is passed through a pair of rubber bushes 33 and 34 sandwiching the upper surface of the piston rod holder 30. The rubber bushes 33 and 34 are clamped between a washer 35 fixed to the piston rod 27 and a washer 37 fixed to the piston rod 27 by a nut 36.

A dish-shaped lower spring seat 38 is fixed to a lower portion of the cylinder 26. A coil spring 39 disposed to surround the circumference of the cylinder 26 is supported at its upper and lower ends on the upper spring seat 31 and the lower spring seat 38, respectively. At this time, an insulator 41 made of a rubber is disposed between a lower surface of the upper spring seat 31 and an upper end of the coil spring 39. The upper spring seat 31 is provided with two locking projections 31a, 31a each formed into a hook-shape by cutting and raising, and two bolt bores 31b, 31b.

Figure 4:
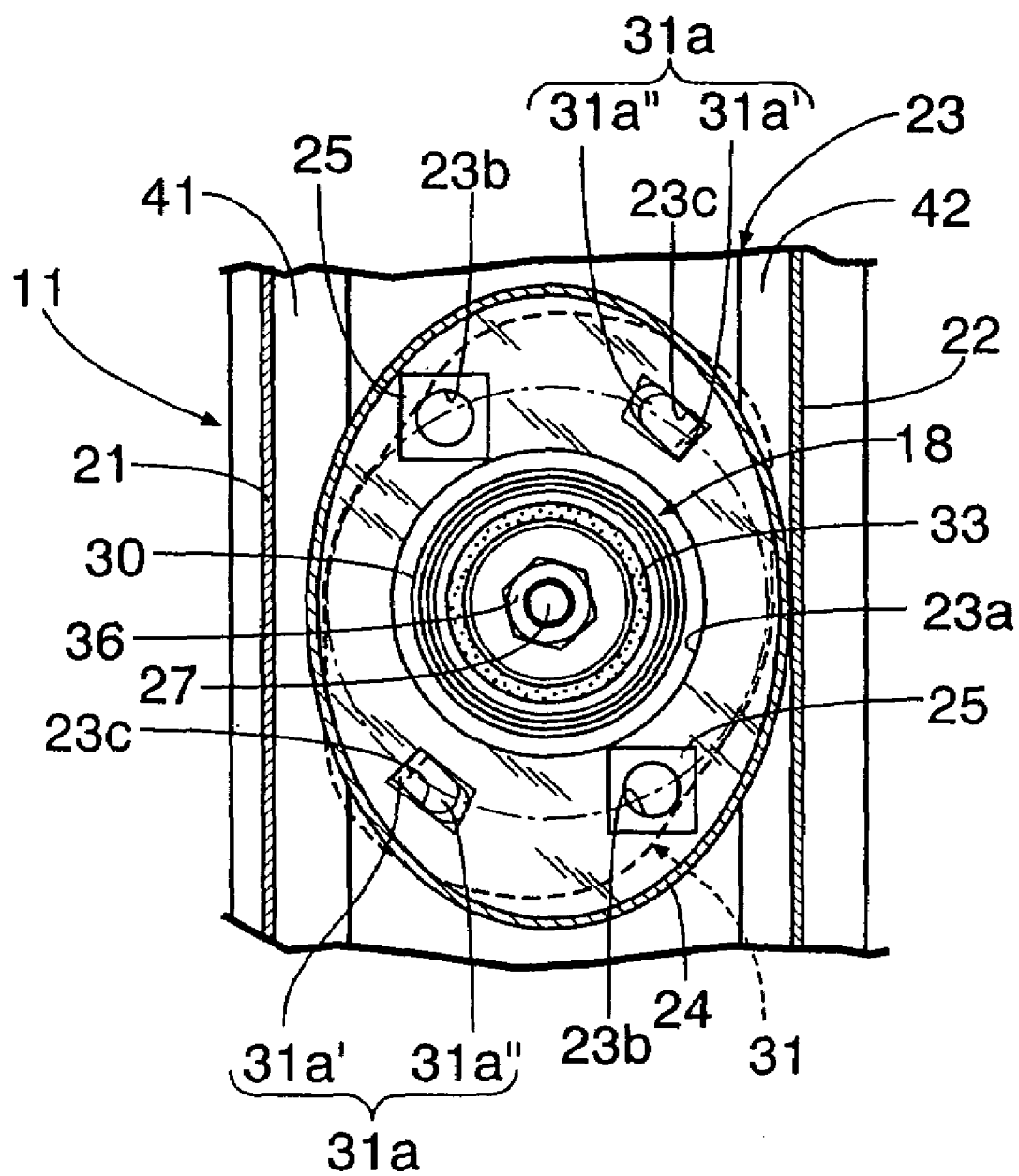

The upper spring seat 31 is relatively elongated in one direction so as to have a somewhat oval peripheral shape, which is similar to the cross sectional shape of the bulkhead 24, as seen best in FIGS. 2 and 4. Each of the locking projections 31a are cut and bent from the upper surface of the upper spring seat 31 so as to have a base portion 31a' connected to the upper spring seat 31 and a body portion 31a" spaced from the upper surface of the upper spring seat 31. As will be apparent from the following, the lower surface of the body portion 31a" is spaced a distance from the upper surface of the upper spring seat 31 so as to receive a portion of the third member 23 and, more specifically, the locking surface 23'.

Figure 3:
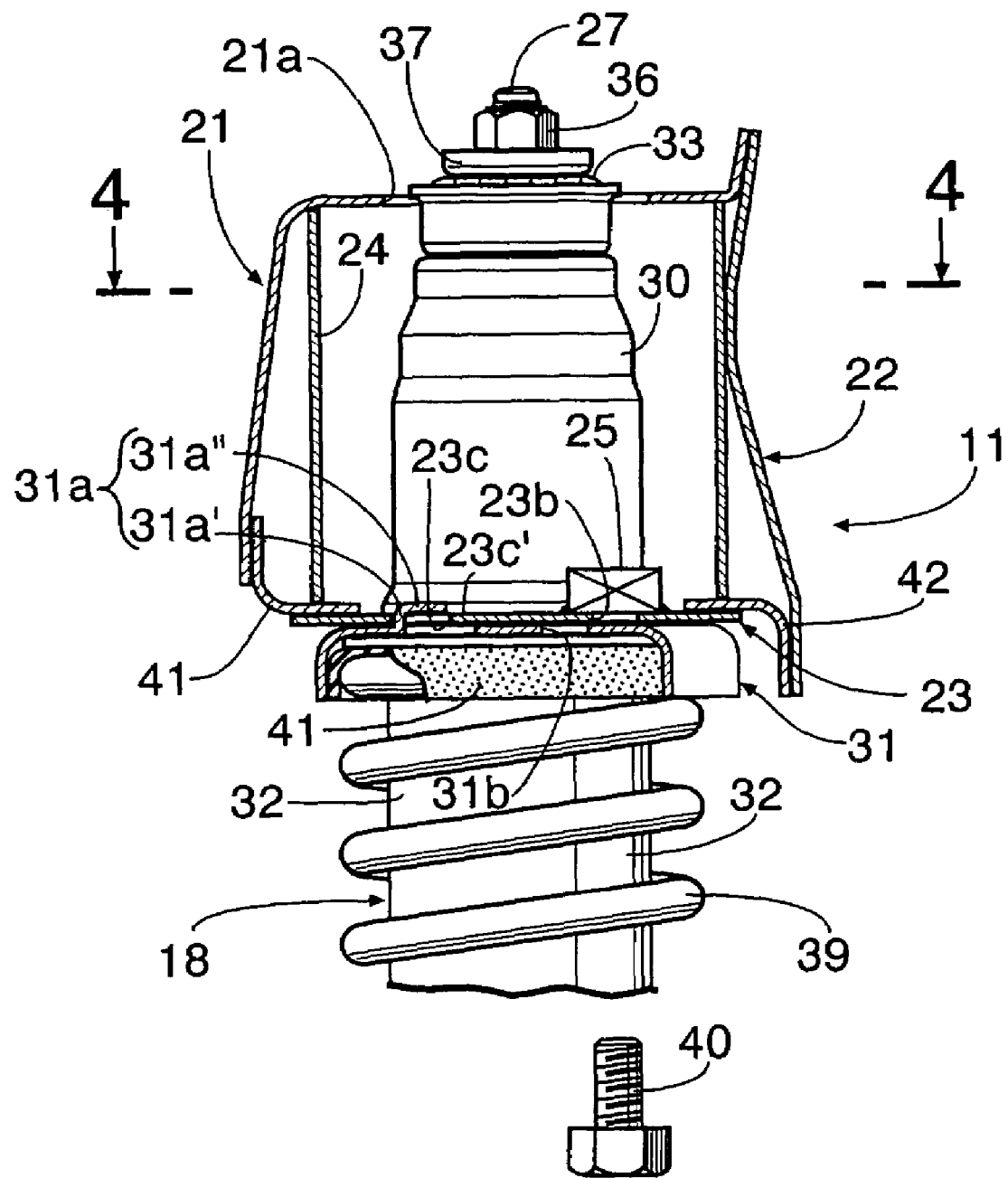
FIG. 3 is a view for explaining the operation during mounting of the damper, illustrating the damper inserted into the vehicle body frame just prior to rotation of the damper to temporarily mount the damper to the vehicle body frame; and, FIG. 4 is a sectional view taken along line 4—4 in FIG. 3.

The damper 18 is assembled and then mounted to a vehicle body in the following manner: the piston rod holder 30 at the upper portion of the damper 18 is inserted from below through the opening 23a in the third member 23 of the side frame 11; the two locking projections 31a, 31a formed on the upper spring seat 31 fixed to the lower portion of the piston rod holder 30 are aligned with, and then inserted through the locking bores 23c, 23c in the third member 23. At this point, the damper 18 is disposed relative to the frame 11 such that the locking projections 31a are aligned with, and extend through, the locking bores 23c (FIGS. 3–4), while the upper spring seat bolt bores 31b are out of alignment with the third member bolt bores 23b (FIG. 3). Thereafter, the damper 18 is rotated to bring the locking projections 31a, 31a into engagement with the locking surfaces 23' adjacent the locking bores 23c, 23c and to bring the upper spring seat bolt bores 31b into alignment with the third member bolt bores 23b.

More specifically, the locking projection body portions 31a" are moved over the associated locking surface 23' whereby the locking surfaces 23' are received beneath the body portion 31a" of the locking projection 31a and, accordingly, the third member 23 is affixed to the upper spring seat 31. As such, the damper 18 is temporarily fixed to the side frame 11, as shown in FIG. 2. In this manner, temporary fixing of the damper 18 to the side frame 11 is completed by simply rotating the damper 18 and, hence, this operation is remarkably easy. When the damper 18 has been temporarily fixed to the side frame 11, the two bolt bores 31b, 31b in the upper spring seat 31 are aligned with the two bolt bores 23b, 23b in the first member 23 (see FIG. 1).

Therefore, in this temporarily fixed state, two bolts 40, 40 are inserted from below into the two bolt bores 31b, 31b in the upper spring seat 31 and the two bolt bores 23b, 23b in the third member 23 and threadably fastened to the weld nuts 25, 25 on the upper surface of the third member 23, whereby the upper portion of the damper 18 is more permanently or securely mounted to the side frame 11. At this time, an upper end of the damper 18 protrudes from the opening 21a in the first member 21 of the side frame 11, as shown in FIG. 1.

As described above, the upper portion of the damper 18 is inserted from below into the openings 23a and 21a in the side frame 11, and the bolts 40, 40 are inserted from below in the same direction as the direction of insertion of the damper 18 and fastened. Therefore, the assembly operation is remarkably simplified, as compared with a conventional case where a nut is fastened from above to a stud bolt mounted on a damper to face upwards to fasten the upper portion of the damper to a vehicle body. Namely, with the present invention it is not necessary for one to insert the damper from below a vehicle body, while another worker fastens a nut from above the vehicle body. Therefore, the present invention makes it possible for one worker to mount the damper 18 to the vehicle frame.

Moreover, in the temporarily fixed state in which the locking projections 31a, 31a have been brought into engagement with the locking surfaces 23' adjacent the locking bores 23c, 23c, the damper 18 is not dropped even if the worker releases his hand from the damper 18 and, hence, fastening the bolts 40, 40 is further simplified. When the lower end of the damper 18 is thereafter coupled to the lower arm by the bolts 29, the damper 18 cannot be rotated about its axis. Therefore, even if the two bolts 40 should be loosened and withdrawn, the upper portion of the damper 18 cannot fall off of, or out of, the side frame 11. Especially, because the upper portion of the damper 18 is fitted within the side frame 11, the falling-off of the damper 18 from the side frame 11 is further reliably prevented.

In addition, the upper portion of the damper 18 is fixed to the lower surface of the side frame 11, which has a high rigidity because it has a closed section. Thus, the support rigidity of the damper 18 is enhanced and, accordingly, the responsiveness of the damper 18 to a load input from the lower arm 16 is improved. Further, since the upper portion of the damper 18 is accommodated within the side frame 11, an internal space in the side frame 11 is utilized for disposition of the damper 18, leading to an enhancement in space efficiency. Moreover, it is unnecessary to arrange the side frame 11 and the damper 18 side-by-side in a lateral direction of the vehicle body, and hence it is easy to ensure sufficient space for disposition of a suspension.

Although the embodiments of the present invention have been described in detail, it will be understood that various modifications in design may be made without departing from the subject matter of the invention.

For example, the damper 18 for a rear wheel is described in the embodiment, but the present invention is also applicable to a damper for a front wheel.

In addition, the lower end of the damper 18 is connected to the lower arm 16 in the embodiment, but may be connected to a knuckle.

Further, the upper portion of the damper 18 has been fixed to the side frame 11 in the embodiment, but may be fixed to another portion such as a wheel well.

What is claimed is:

1. A mounting structure for a damper, said damper having an upper portion and a lower portion, said upper portion being fixed to a vehicle body while said lower portion being connected to a suspension, wherein said mounting structure includes the vehicle body and a damper mounting portion, said damper mounting portion being secured to the body so as to mount the damper to the body, wherein the damper mounting portion includes a temporary fixing means having a locking projection that cooperates with and engages a locking bore in the vehicle body to temporarily fix the damper to the body from below the body, and wherein, after the damper has been temporarily fixed to the vehicle body with the temporary fixing means, the damper mounting portion and said vehicle body further cooperate to receive fasteners at bolt bores formed therein to fix the damper to the body, and wherein when said damper mounting portion and vehicle body are temporarily fixed together, their bolt bores are aligned with each other and the fasteners are installed in said mounting portion and said body from below said body.

2. The mounting structure according to claim 1, wherein the locking projection is a hook-shaped locking projection, and the damper is temporarily fixed to the vehicle body by inserting the locking projection into the locking bore formed in the vehicle body and rotating the damper to bring the locking projection into engagement with a locking surface of the vehicle body, said locking surface being disposed adjacent the locking bore.

3. The combination according to claim 1, wherein the vehicle body includes a lower wall, an upper wall, and a sidewall that are secured to one another so as to define a closed section with an interior space, said lower wall having an opening through which an upper portion of the damper is inserted into said interior space and said locking bore and said bolt bore surrounding said opening, each of said bores on said lower wall being spaced inwardly from said sidewall so as to be within said closed section, and wherein said mounting portion is an upper spring seat of the damper.

4. A method for mounting a damper to a vehicle, said damper comprising a mounting portion having a locking projection and a bolt bore, said vehicle comprising a vehicle body frame comprising a plurality of members cooperating to provide a closed section, said plurality of members including a lower member, said lower member having an upper surface, a lower surface, and defining an opening through which said damper extends, said lower member further defining a locking bore and a bolt bore, said method comprising the steps of:
   (a) inserting said damper into said opening from below;
   (b) aligning said locking projection with said locking bore;
   (c) inserting said locking projection through said locking bore; and,
   (d) rotating said damper such that said locking projection moves relative to said locking bore and is disposed adjacent said lower member upper surface and out of alignment with said locking bore to temporarily secure the damper to said vehicle body frame while simultaneously moving said mounting portion bolt bore into alignment with said lower member bolt bore; and,
   (e) inserting a bolt through said aligned bolt bores to secure the damper to the vehicle body frame.

5. The method of claim 4, wherein steps (a)–(e) are performed sequentially.

6. The method of claim 4, wherein, in step (e), the bolt is inserted upwardly from below said vehicle body frame.

7. The method of claim 4, wherein the damper includes an upper portion, a lower portion, and wherein the mounting portion is disposed between said upper and lower portions, and wherein, in step (a) the damper is inserted into the opening from below such that said damper upper portion projects through said lower member opening and is disposed above said lower member while said mounting portion is abutting the lower surface of the lower member.

* * * * *